United States Patent
Longo et al.

(10) Patent No.: US 7,022,771 B2
(45) Date of Patent: Apr. 4, 2006

(54) OLEFIN COPOLYMERS CONTAINING CYCLOPROPANE RINGS IN THE MAIN CHAIN

(75) Inventors: Pasquale Longo, Salerno (IT); Stefania Pragliola, Marina di Minturno LT (IT); Gaetano Guerra, Salerno (IT)

(73) Assignee: Universita' Degli Studi de Salerno, Salerno (IT)

(*) Notice: Subject to any disclaimer, the term of this patent is extended or adjusted under 35 U.S.C. 154(b) by 0 days.

(21) Appl. No.: 10/479,750

(22) PCT Filed: Jun. 5, 2002

(86) PCT No.: PCT/IT02/00369

§ 371 (c)(1),
(2), (4) Date: Jun. 4, 2004

(87) PCT Pub. No.: WO02/098936

PCT Pub. Date: Dec. 12, 2002

(65) Prior Publication Data

US 2004/0236044 A1    Nov. 25, 2004

(30) Foreign Application Priority Data

Jun. 5, 2001    (IT) .......................... SA2001A0016

(51) Int. Cl.
*C08F 8/00* (2006.01)
*C08F 4/42* (2006.01)

(52) U.S. Cl. ...................... 525/192; 525/195; 525/232; 525/236; 525/240; 526/126; 526/160; 526/348

(58) Field of Classification Search ................ 525/192, 525/195, 232, 236, 240; 526/160, 126, 348
See application file for complete search history.

(56) References Cited

U.S. PATENT DOCUMENTS 3,931,127 A    1/1976    Halasa et al.

FOREIGN PATENT DOCUMENTS

| EP | 0 275 676 | 7/1988 |
| EP | 0 891 993 | 1/1999 |
| EP | 0 892 013 | 1/1999 |
| EP | 0 892 014 | 1/1999 |

OTHER PUBLICATIONS

Cavallo, Gabriella, et al., "Thermal Crosslinking of Ethane Copolymers Containing 1,2-Cyclopropane Units", Elsevier Editorial(tm) for Polymer Manuscript, 2005, pp. 2847-2853, No. 46.

*Primary Examiner*—Duc Truong
(74) *Attorney, Agent, or Firm*—Browdy and Neimark, PLLC

(57) ABSTRACT

The invention relates to copolymers of alkenes and conjugated dienes containing cyclopropane and cyclopentane rings in the main chain. These copolymers are charachterised in that the amount of cyclopropane units is between 0.1% and 50% by weight and that the molar percent of the cyclopropane units is higher than the molar percent of the unsubstituted cyclopentane units.

24 Claims, 1 Drawing Sheet

OLEFIN COPOLYMERS CONTAINING CYCLOPROPANE RINGS IN THE MAIN CHAIN

The invention relates to copolymers based on alkenes and conjugated dienes, which contain cyclopropane and cyclopentane, rings in the main chain.

PRIOR ART

It is well known that, among the polymeric materials, polyolefins present a high technological relevance. In fact, olefinic homopolymers and copolymers, mainly low and high-density polyethylenes, isotactic polypropylene, ethylene-propylene and ethylene-propylene-diene rubber, represent nearly 40% of the world market of synthetic polymeric materials.

One of the advantages of polyolef in materials is their poor chemical reactivity. In fact, beyond possible functional terminal groups, which for high molecular mass polymers are present in negligible amounts, chemically reactive groups are not present. However, for several applications it is important to insert on the polyolef in chains a controlled number of reactive functional groups, aimed to improve some properties, for instance, the adhesion and compatibility with other materials or printing processes on their surfaces or to favour their crosslinking processes. It is worth noting that the introduction of a controlled number of reactive functional groups can also allow a control of degradation processes, i.e. of the reduction of molecular mass by aging.

Only in few cases it is possible to insert reactive functional groups in polyolef in chains by copolymerisation processes with functionalised monomers, since, in general, the required functional groups may not be compatible with the industrially used polymerisation catalytic systems. As a consequence, the functionalisation of polyolef ins is mainly obtained by the addition to preformed polyolef in chains of functionalised organic compounds, mainly by means of radical initiators in industrial blenders.

The European Patent EP-0275 676 discloses ethylene based copolymers which include, in their main chain, unsubstituted cyclopentane rings connected in positions 1 and 2 which can be obtained through ethylene and butadiene copolymerisation, with suitable catalytic systems. However, due to their high thermodynamic stability, such rings including five carbon atoms cannot be considered reactive functional groups.

The U.S. Pat. No. 6,310,164 discloses unsaturated olefin copolymers based on α olefins and dienes and a process for their preparation. The thus obtained copolymers contain in the main chain cyclopentane and cyclopropane units and a high degree of instauration due to 1,4 insertion of the diene monomer into the chain. Also in this case, the cyclic units are essentially represented by stable five-member rings, while the more reactive cyclopropane units are present in a negligible molar amount, which is not sufficient to give the needed reactivity to the polymer.

Scope of the present invention is to provide olef in based polymers having high amounts of reactive cyclopropane rings in the main chain, and, accordingly, which are characterized by a higher reactivity with respect to the polymers of the prior art.

SUMMARY OF THE INVENTION

The present invention is based on the discovery that reactive olefin based copolymers can be obtained by copolymerisation reaction of olefin and diene monomers operating at controlled conditions as to temperature, times and molar ratios between monomers. In particular, copolymerisation reactions conducted by suitable catalytic systems produce copolymers containing in the main chain cyclopropane reactive units in molar percent markedly higher than that of unsubstituted cyclopentane units, and also higher than the instaurations along the main chain, due to 1,4 insertion of the diene monomer. Such cyclopropane units can possibly be functionalised by opening their cyclic structure by suitable reactants.

Hence, object of the invention are olefin copolymers based on an alkene having 2 to 12 carbon atoms, and a conjugated diene having 4 to 8 carbon atoms, which copolymers comprise in the main chain cycloalkane units with 3 or 5 members, more precisely cyclopropane units and substituted or unsubstituted cyclopentane units. These copolymers are characterized by the fact that the amount of cyclopropane units is between 0.1% and 50% by weight and that the molar percent of cyclopropane units is higher than the molar percent of the unsubstituted cyclopentane units.

Advantageously the olefin monomer comprises ethylene and optionally one or more additional olefins, like for instance propylene, while the diene monomer is preferably butadiene.

When the alkene monomer is propylene and the diene monomer is butadiene, the cyclic units with five members are 3-methyl-1,2-cyclopentane units.

Further object of the invention are functionalised copolymers obtainable by opening of cyclopropane units through acetylation, hydrohalogenation and esterification reactions.

Further object of the invention are copolymers, in which the alkene is propylene, the alkyl,1,3, diene is butadiene and the five members cyclopentane units are 3-methyl-1,2-cyclopentane units.

Further object of the invention are processes for producing the title copolymers in which the polymerisation reaction of the mixture of alkene and conjugated diene monomers is conducted in the presence of insertion polymerisation catalytic systems, comprising ansa-metallocenes in which the π ligand is constituted by two bridge-bonded cyclopentadienyl groups, both groups being substituted in positions 3 and 4. The catalytic system also comprises a cocatalyst selected from the class consisting of linear or cyclic alumoxanes and compounds capable of forming an alkyl metallocene cation.

Further object of the invention are preparation processes, which comprise as an intermediate step the opening of cyclopropane units by using suitable reactants.

Further objects of the invention are articles which comprise, or are prepared with, the copolymers or the functionalised copolymers of the invention, optionally blended with other polymeric materials, and processes for their preparation, in which the reaction mixture is polymerised in a defined shape or the polymer melt is shaped or moulded in a defined shape.

The use of the copolymers of the present invention in the preparation of the above cited articles offers several advantages, such as a better adhesion and compatibility with other polymeric and non polymeric materials; moreover, it facilitates printing processes on their surfaces and it favours crosslinking processes between linear polymeric chains.

Due to these properties, the polymers of the present invention have a broad applicability in several technology fields. A specific example is given by their use, alone or in mixture with other polymers, in the preparation of protective sheaths of electrical materials and cables. Finally, the introduction of a controlled number of reactive functional groups allows the control of degradation processes, that is the reduction of molecular mass with aging, property, which makes the copolymers of the present invention also suitable for applications in bioadsorbable prostheses or for the degradation of such materials used for disposable applications.

Figure 1:
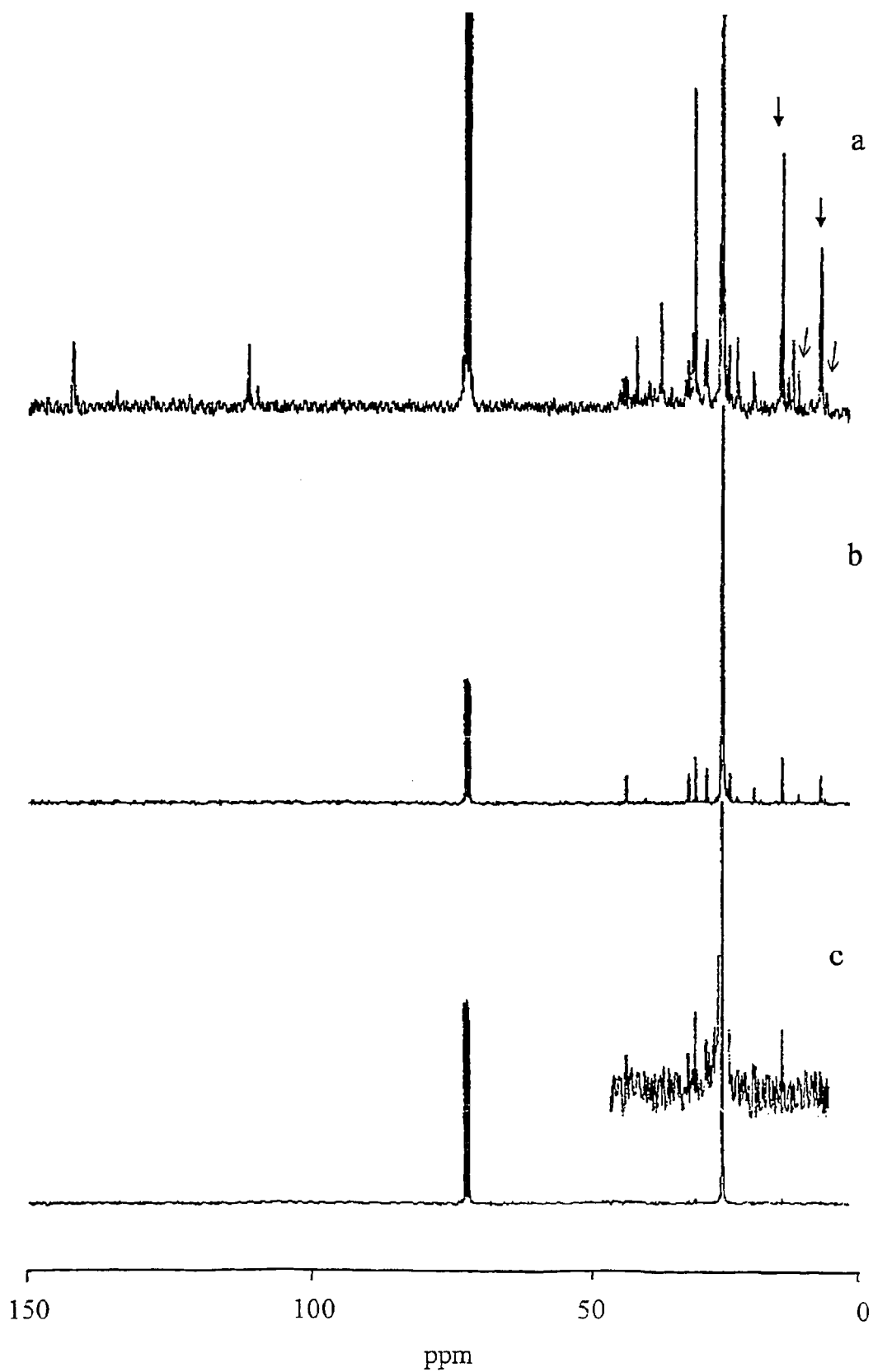
FIG. 1 describes three $^{13}$C NMR spectra of the copolymers of the invention.

Panel 1a represents the spectrum of the copolymer according to Example 1. In particular, it is apparent at least one of the two resonances, which can be attributed to the methylene group of the cyclopropane ring with trans or cis configurations, localized at 10.1 and 9.2 ppm, respectively, as well as at least one of the two resonances, which can be attributed to the methyne group of the cyclopropane ring with trans or cis configurations, localized at 17.1 and 14.1 ppm, respectively.

Panels 1b and 1c show the spectra of the copolymers according to examples 2 and 3.

DETAILED DESCRIPTION OF THE INVENTION

The present invention refers to new olefin based copolymers, which present in the main chain cyclopropane rings of formula (I):

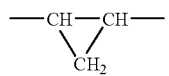
(I)

which, due to their well known thermodynamic instability, can be considered reactive functional groups.

The copolymers of the present invention are copolymerisation products of one or more olefin monomers, specifically α olefins having 2 to 12 carbon atoms and of a conjugated diene having 4 to 12 carbon atoms.

In the preferred embodiments of the invention, the olefin monomers consist of ethylene, propylene or mixtures thereof. The diene monomer is preferably 1,3-butadiene.

In the copolymerisation process, the diene molecules can be inserted into the polymeric chain through 1,2 insertion or through 1,4 insertion. In the first case, the diene insertion will produce unsaturated branches on the main chain. In the second case, the diene insertion will result in instaurations along the main chain.

Depending on the polymerisation conditions, copolymers of different compositions which have polymerisation degrees higher than 50, generally with weight average molecular masses in the range 3000–10$^6$ atomic mass units (a.m.u.), will be obtained.

The copolymers of the invention contain cyclopropane units of formula (I) in an amount in the range 0.1% to 50% by weight, preferably between 1% and 20%, e.g. 10%. Beside to cyclopropane units, the disclosed copolymers can also contain substituted or unsubstituted five-member cyclic units. Provided the latter are unsubstituted cyclopentane units, their molar amount will be lower than the molar amount of cyclopropane units.

The copolymers of the invention present $^{13}$C nuclear magnetic resonance spectra comprising at least one of the two resonances, which can be attributed to the methylene group of the cyclopropane ring with trans or cis configurations, localized, respectively, at 10.1 and 9.2 ppm (FIG. 1a), as well as at least one of the two resonances, which can be attributed to the methyne group of the cyclopropane ring with trans or cis configurations, localized, respectively, at 17.1 and 14.1 ppm (FIG. 1b). These copolymers can include also close sequences of cyclopropane rings of the kind:

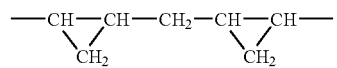

which can be detected in $^{13}$C nuclear magnetic resonance spectra as signals of the main chain methyne and methylene carbons located at 15.0 and 38.3 ppm, respectively.

When the copolymer contains beside cyclopropane units also substituted cyclopentane units, precisely 3-methyl-1,2-cyclopentane units, the $^{13}$C NMR spectrum of the polymer presents resonances at 11.0 and 19.9 ppm, which can be attributed to methylene and methyne carbons of cyclopropane units in trans configuration as well as resonances close to 15 ppm and 41 ppm which can be attributed to methyl and methyne carbons of 3-methyl-1,2-cyclopentane units.

The weight fraction of cyclopropane units ($X_A$), in ethylene based polymers can be obtained by the equation:

$$X_A = \frac{\Sigma(Ac_a)40}{\Sigma[(Ac_b) - 3(Ac_b) - Ac_c - 5(Ac_d)]14 + \Sigma(Ac_a)40 + 1/2\Sigma(Ac_c)54 + \Sigma(Ac_d)68}$$

where: $Ac_a$=area of signals between 9.2 and 10.1 ppm;

$Ac_b$=area of signals between 5 and 55 ppm, relative to all saturated carbons;

$Ac_c$=area of signals between 105 and 150 ppm, relative to the possible presence of unsaturated carbons;

$Ac_d$=area of signals close to 22.2 ppm, relative to the possible presence of cyclopentane rings;

The molar fraction of cyclopropane units ($X_A$), in propylene based polymers can be obtained by the equation:

$$X_A = \frac{A_{Cb}}{A_{Ca} - A_{Cb} + A_{Cc} + A_{Cd} + 1/2A_{Ce}}$$

where: $Ac_a$=area of signals between 19.0 and 19.9 ppm relative to methyl carbons of propylene units and to methyne carbons of cyclopropane units;

$Ac_b$=area of signals close to 11.0 ppm relative to methylene carbons of cyclopropane units;

$Ac_c$=area of signals between 14.9 and 15.5 ppm, relative to the methyl carbons of 3-methyl-1,2-cyclopentane units;

$Ac_d$=area of signals close to 111 ppm, relative to unsaturated methylene carbons of 1,2 inserted butadiene units;

$Ac_e$=area of signals close to 127.8 ppm, relative to the unsaturated carbons of 1,4 inserted butadiene units.

The polymers of this invention present a homogeneous intermolecular distribution of cyclopropane rings. The homogeneity of this distribution is for instance shown by the fact that the obtained copolymers cannot be separated by solvent extraction in significant (larger than 5% by weight) fractions, which present $X_A$ values differing more than 50% from the $X_A$ value of the unfractioned sample.

To obtain the copolymers described in the present patent application it is possible to use homogeneous catalytic systems for insertion polymerisation of 1-olefins. Ansa-metallocenes based catalytic systems are preferably used, where the π ligand is constituted by two bridge-bonded cyclopentadienyl groups, both being substituted in positions 3 and 4. Examples of such metallocenes are rac-methylene-bis-(3-tertbutyl-1-indenyl)ZrCl$_2$, or rac-isopropylidene-bis-(3-tertbutyl-1-indenyl)ZrCl$_2$, or rac-dimethylsilyl-bis-(3-tertbutyl-1-indenyl)ZrCl$_2$, or isopropylidene-bis-(fluorenyl)ZrCl$_2$, or rac-methylene-bis-(3-isopropyl-1-indenyl)ZrCl$_2$.

Since polymerisation yields depend on metallocene purity, these can be used, according to the present invention, as such or are preferably subjected to preliminary purification processes.

The catalytic system of the present invention also comprises a cocatalyst. Suitable cocatalysts are alumoxanes or compounds capable of forming an alkyl metallocene cation. Alumoxanes useful as cocatalysts may be linear or cyclic. The molar ratio between aluminum and the metal of the metallocene is comprised between about 10:1 and about 5000:1, and preferably between 100:1 and 4000:1.

Examples of alumoxanes suitable as cocatalysts in the process of the invention are methylalumoxane (MAO), tetra-isobutyl-alumoxane (TIBAO) and tetra-2,4,4-trimethylpentylalumoxane. Further cocatalysts suitable in the catalysts of the invention are those compounds capable of forming an alkylmetallocene cations. Examples are boron compounds, tetrakis-pentafluorophenyl-borate is particularly preferred. Moreover, compounds of formula BAr$_3$ can be conveniently used.

The catalysts of the present invention can also be used on an inert support, by depositing the metallocene, or the reaction product of the metallocene with the cocatalyst, or the cocatalyst first and then the metallocene, on the inert support.

The metallocene and cocatalyst may suitably be put together before the polymerisation. The contact time may be comprised between 1 and 60 minutes, preferably between 5 and 20 minutes. The pre-contact concentrations for the metallocene are comprised between $10^{-2}$ and $10^{-8}$ mol/l, whereas for the cocatalyst are comprised between 10 and $10^{-3}$ mol/l. The pre-contact is generally carried out in the presence of a hydrocarbon solvent or small amount of monomer.

The polymer of the present invention can be obtained by copolymerisation of an olefin of 2 to 12 carbon atoms and of a 1,3 diolefin of 4 to 8 carbon atoms. Preferably, the olefin is ethylene, propylene or a mixture thereof, while the diene is 1,3-butadiene. The olefin concentration is comprised between 0.1 and 7 M, the diolefin concentration is comprised between $10^{-3}$ and 9 M, while the metallocene concentration is comprised between $10^{-8}$ and $10^{-2}$ M. One or more additional olefins, in concentrations comprised between 0.1 and 5 M, can be advantageously added to the above cited monomers or mixtures of monomers. The polymerisation temperature is comprised in the range −30° C.+200° C., preferably between 20° C. and 90° C.

The molecular mass of the polymers can be varied by changing the polymerisation temperature or the kind or the concentration of the catalyst components, or by using molecular mass regulators, such as hydrogen.

The molecular mass distribution of the polymers can also be varied by using mixtures of different metallocenes or conducting the polymerisation in several steps differing for polymerisation temperature and/or for monomer concentrations.

The polymerisation process, according to the present invention, can be conducted either in gas or in liquid phase, or in the presence of an inert hydrocarbon solvent, which may be aromatic, such as benzene or toluene, or aliphatic, such as hexane, heptane or cyclohexane.

The polymers object of the present invention can be functionalised by known reactions suitable for opening three member hydrocarbon rings, for instance, an acetylation with Pb(Oac)$_4$, or an hydrohalogenation with HBr, or an esterification with CF$_3$COOH.

The invention is further described by the following examples, which however do not limit its scope.

EXAMPLE 1

In a 100 mL three-neck pyrex glass flask kept at 20° C., 10 mL toluene and 280 mg methylalumoxane (MAO) are introduced, in the sequence, under nitrogen atmosphere; after nitrogen removal, 2.35 g of 1,3-butadiene are dissolved in the liquid phase and, subsequently, 3 mg of the rac-methylene-bis-(3-tertbutyl-1-indenyl)ZrCl$_2$ catalyst are dissolved, under nitrogen atmosphere, in 2 mL of anhydrous toluene. The reactor is continuously fed with ethylene by applying an overpressure of 3 cm of Hg (with an ethylene concentration of 0.137 mol/L). After a 20-hour reaction time, the produced polymer is coagulated in 200 mL of ethanol acidified with HCl, filtered and vacuum dried. The yield is about 830 mg. The $^{13}$C NMR spectrum of the polymer (FIG. 1a) presents resonances at 10.1 and 17.1 ppm, which can be attributed to cyclopropane units with trans configuration, and resonances localized at 9.2 and 14.1 ppm, which can be attributed to cyclopropane units with cis configuration. The ratio between the intensities of the signals relative to the two configurations is close to 10:1. The analysis of this spectrum indicates that the polymer is composed by 73 mol % of ethylene units, 10 mol % of cyclopropane units, 4 mol % of cyclopentane units, 12 mol % of 1,2 inserted butadiene units and 1 mol % of 1,4 inserted butadiene units ($X_A$=0.10).

From the differential scanning calorimetric analysis, carried out with a scanning rate of 10 K/min, the polymer results to be essentially amorphous.

EXAMPLE 2

In a 100 mL three-neck pyrex glass flask kept at 20° C., 10 mL toluene and 280 mg methylalumoxane (MAO) are introduced, in the sequence, under nitrogen atmosphere; after nitrogen removal, 0.40 g of 1,3-butadiene are dissolved in the liquid phase, then the internal pressure is increased up to 1.0 atm with ethylene. The reaction is started by injecting in the flask, under nitrogen atmosphere, 3 mg of the rac-methylene-bis-(3-tertbutyl-1-indenyl)ZrCl$_2$ catalyst dissolved in 2 mL of anhydrous toluene. The reactor is continuously fed with ethylene by applying an overpressure of 2 cm of Hg. After a 20-hour reaction time, the produced polymer is coagulated in 200 mL of ethanol acidified with HCl, filtered and vacuum dried. The yield is about 600 mg. The $^{13}$C NMR spectrum of the polymer (FIG. 1b) presents resonances at 10.1 and 17.1 ppm, which can be attributed to cyclopropane units with trans configuration, and resonances localized at 9.2 and 14.1 ppm, which can be attributed to cyclopropane units with cis configuration. The ratio between the intensities of the signals relative to the two configurations is about 5:1. The analysis of this spectrum indicates that the polymer is composed by 95 mol % of ethylene units, 3.8 mol % of cyclopropane units, 1.2 mol % of cyclopentane units ($X_A$=0.038).

From the differential scanning calorimetric analysis, carried out with a scanning rate of 10 K/min, the polymer results to be characterized by a melting temperature of 117° C. ($\Delta H_m$=94 J/g)an by a $T_g$ inferior to −100° C.

EXAMPLE 3

The reaction is conducted at 20° C. in an autoclave of 250 mL containing 100 mL of toluene, 3.0 g of 1,3-butadiene, 0.29 g of methylalumoxane (MAO) and 3 mg of the same catalyst employed in the examples 1 and 2, by feeding with ethylene at 6 atmospheres. The reaction is stopped after a reaction time of 2 minutes, and nearly 2.0 g of product are obtained. The $^{13}$C NMR spectrum of the polymer (FIG. 1c) presents resonances at 10.1 and 17.1 ppm, which can be attributed to cyclopropane units with trans configuration. The analysis of this spectrum indicates that the polymer is composed by 99.75 mol % of ethylene units, 0.15 mol % of cyclopropane units, 0.1 mol % of cyclopentane units ($X_A$=0.015).

From the differential scanning calorimetric analysis, carried out with a scanning rate of 10 K/min, the polymer results to be characterized by a melting temperature of 130° C. ($\Delta H_m$=138.4 J/g) an by a $T_g$ inferior to −100° C.

The homogeneous distribution of comonomers is confirmed by extraction tests with hydrocarbon solvents: the polymer is completely soluble in boiling hexane and completely insoluble in boiling diethylether.

EXAMPLE 4

The reaction is conducted at 50° C. in an autoclave of 250 mL containing 100 mL of toluene, 8.1 g of 1,3-butadiene, 0.29 g of methylalumoxane (MAO) and 3 mg of the same catalyst employed in the examples 1, 2 and 3, by feeding with ethylene at 6 atmospheres.

The reaction is stopped after a reaction time of 9 minutes, and nearly 2.0 g of product are obtained.

The $^{13}$C NMR spectrum of the polymer presents resonances at 10.1 and 17.1 ppm, which can be attributed to cyclopropane units with trans configuration, and resonances localized at 9.2 and 14.1 ppm, which can be attributed to cyclopropane units with cis configuration. The ratio between the intensities of the signals relative to the two configurations is about 8:1. The analysis of this spectrum indicates that the polymer is composed by 97.9 mol % of ethylene units, 1.2 mol % of cyclopropane units, 0.9 mol % of cyclopentane units ($X_A$=0.012).

From the differential scanning calorimetric analysis, carried out with a scanning rate of 10 K/min, the polymer results to be characterized by a melting temperature of 122° C. ($\Delta H_m$=136.5 J/g).

EXAMPLE 5

In a 100 mL three-neck pyrex glass flask kept at 20° C., 10 mL toluene and 280 mg methylalumoxane (MAO) are introduced, in the sequence, under nitrogen atmosphere; after nitrogen removal, 0.330 g of 1,3-butadiene are dissolved in the liquid phase, then the internal pressure is increased up to 1.0 atm by propylene. The reaction is started by injecting in the flask, under nitrogen atmosphere, 3 mg of the rac-methylene-bis-(3-tertbutyl-1-indenyl)ZrCl$_2$ catalyst dissolved in 2 mL of anhydrous toluene. The reactor is continuously fed with propylene by applying an overpressure of 20 cm of Hg.

After a 15-hour reaction time, the produced polymer is coagulated in 200 mL of ethanol acidified with HCl, filtered and vacuum dried.

The yield is about 300 mg. The $^{13}$C NMR spectrum of the polymer presents resonances at 11.0 and 19.9 ppm, which can be attributed to methylene and methyne carbons of cyclopropane units in trans configuration as well as resonances close to 15 ppm and 41 ppm which can be attributed to methyl and methyne carbons of 3-methyl-1,2-cyclopentane units. The analysis of this spectrum indicates that the polymer is composed by 88.8 mol % of ethylene units, 1 mol % of cyclopropane units ($X_A$=0.01), 3.2 mol % of 3-methyl-1,2-cyclopentane units, 2.5 mol % of 1,2 inserted butadiene units and 4.5 mol % of 1,4 inserted butadiene units.

The invention claimed is:

1. Olefin copolymers of an alkene having 2 to 12 carbon atoms and a conjugated diene having 4 to 8 carbon atoms, including in the main chain cyclopropane units and cyclopentane units, which cyclopropane units can be substituted or unsubstituted;
    wherein the amount of cyclopropane units is between 0.1% and 50% by weight and the molar percent of cyclopropane units is greater than the molar percent of unsubstituted cyclopentane units present in the copolymers.

2. The copolymers according to claim 1 wherein the alkene is ethylene and/or propylene and the conjugated diene is butadiene.

3. The copolymers according to claim 1 wherein the alkene is propylene, the conjugated diene is butadiene and the cyclopentane units are 3-methyl-1,2-cyclopentane units.

4. The copolymers according to claim 1 which present a degree of polymerisation not lower than 50.

5. Process for the production of olefin copolymers of alkene having 2 to 12 carbon atoms and of a conjugated diene having 4 to 8 carbon atoms, which comprise in the main chain cyclopropane units and substituted or unsubstituted cyclopentane units and in which the amount of cyclopropane units is between 0.1% and 50% by weight and the molar percent of cyclopropane units is higher than the molar percent of the unsubstituted cyclopentane units, characterized in that the polymerisation reaction of the alkene and conjugated diene mixture is conducted in the presence of insertion polymerisation catalytic systems.

6. Process according to claim 5, wherein the olef in monomer is ethylene and/or propylene and the conjugated diene is butadiene.

7. Process according to claim 5, wherein the catalytic system comprises ansa-metallocenes in which the π ligand is constituted by two bridge-bonded cyclopentadienyl groups, both being substituted in positions 3 and 4.

8. Process according to claim 5, wherein the catalytic system comprises ansa-metallocenes in which the π ligand is constituted by two bridge-bonded cyclopentadienyl groups, both being substituted in positions 3 and 4 and a cocatalyst selected from the group consisting of linear or cyclic alumoxanes and compounds capable of forming an alkyl metallocene cation.

9. Process according to claim 8, wherein the cocatalyst is an alumoxane and the molar ratio between aluminum and the metal of the metallocene is comprised between 10:1 and 5000:1, and preferably between 100:1 and 4000:1.

10. Process according to claim 5, wherein the reaction is conducted at a temperature comprised between −30° C. +200° C. and wherein the olef in monomer concentration is comprised between 0.1 and 7 M, the diene monomer concentration is comprised between $10^{-3}$ and 9 M, and the catalyst concentration is comprised between $10^{-8}$ and $10^{-2}$ M.

11. The process according to claim 5, wherein the reaction is conducted at a temperature between 20° C. and 90° C., and wherein the olefin concentration is between 0.1 and 7 M, the concentration of the diene monomer is between $10^{-3}$ M and 9 M, and the catalyst concentration is between $10^{-8}$ M and $10^{-2}$ M.

12. Process according to claim 5, wherein the reaction mixture further comprises one or more additional olefins in concentration between 0.1 and 5 M.

13. Functionalised copolymers obtainable from the copolymers according to claim 1.

14. Functionalised copolymers, obtainable from the copolymers according to claim 1 by opening the cyclopropane units through acetylation, hydrohalogenation or esterification reactions.

15. Process for the preparation of functionalised copolymers according to claim 13, which comprises opening the cyclopropane units with suitable reactants.

16. Articles comprising or realized with the copolymers according to claim 1, optionally blended with other polymeric materials.

17. Article comprising or realized with the functionalised copolymers according to claim 13 optionally blended with other polymeric materials.

18. Article, according to claim 16, in the form of sheath for electrical cables.

19. Article, according to claim 17, in the form of sheath for electrical cables.

20. Article, according to claim 16, obtained through crosslinking process.

21. Article, according to claim 17, obtained through crosslinking process.

22. Process for the manufacture of articles comprising or realized with the copolymer according to claim 1, or with a functionalised copolymer thereof, wherein said copolymer according to claim 1 or said functionalised copolymer thereof, optionally in the presence of other materials, is polymerised in a defined shape or the polymer melt is shaped or moulded in a defined shape.

23. A process for the preparation of copolymers according to claim 1 wherein a catalytic system comprising a catalyst selected from rac-methylene-bis-(3-tertbutyl-1-indenyl)$ZrCl_2$, or rac-isopropylidene-bis-(3-tertbutyl-1-indenyl)$ZrCl_2$, or rac-dimethylsilyl-bis-(3-tertbutyl-1-indenyl)$ZrCl_2$, or rac-isopropylidene-bis-(fluorenyl)$ZrCl_2$, or rac-methylene-bis-(3-isopropyl-1-indenyl)$ZrCl_2$ and a cocatalyst selected from methylalumoxane (MAO), tetra-isobutyl-alumoxane and tetra-2,4,4-trimethylpentylalumoxane or compounds capable of forming an alkylmetallocene cation is used.

24. The process, according to claim 23, wherein the catalytic system is in form of solution or is deposited onto an inert support.

* * * * *